United States Patent [19]

Maccabee

[11] Patent Number: 5,842,709
[45] Date of Patent: Dec. 1, 1998

[54] RETRACTABLE, SWING DOWN STEP ASSEMBLY

[75] Inventor: Malcolm M. Maccabee, Yoncalla, Oreg.

[73] Assignee: Kwikee Products Co., Inc., Cottage Grove, Oreg.

[21] Appl. No.: 732,169

[22] Filed: Oct. 16, 1996

[51] Int. Cl.[6] .................................................. B60R 3/00
[52] U.S. Cl. ........................... 280/166; 280/163; 182/91; 182/127; 192/129 R
[58] Field of Search ..................... 280/166, 163; 182/88, 90, 91, 127; 192/129 R, 150

[56] References Cited

U.S. PATENT DOCUMENTS

| | | |
|---|---|---|
| 3,751,068 | 8/1973 | Green . |
| 3,758,134 | 9/1973 | Stewart . |
| 3,762,742 | 10/1973 | Bucklen . |
| 3,980,319 | 9/1976 | Kirkpatrick . |
| 4,231,583 | 11/1980 | Learn . |
| 4,317,511 | 3/1982 | Asai ..................... 192/48.92 |
| 4,982,974 | 1/1991 | Guidry ................. 280/166 X |
| 5,085,450 | 2/1992 | DeHart, Sr. . |
| 5,310,010 | 5/1994 | Lo ......................... 192/56 R |
| 5,358,268 | 10/1994 | Hawkins .............. 280/166 X |
| 5,375,864 | 12/1994 | McDaniel . |
| 5,498,012 | 3/1996 | McDaniel et al. . |
| 5,538,269 | 7/1996 | McDaniel et al. . |
| 5,697,626 | 12/1997 | McDaniel et al. ........ 280/166 |

FOREIGN PATENT DOCUMENTS

| | | |
|---|---|---|
| 63-255144 | 10/1988 | Japan . |
| 4-138944 | 5/1992 | Japan . |
| 4-339040 | 11/1992 | Japan . |
| 403594 | 3/1974 | U.S.S.R. . |
| 934387 | 8/1963 | United Kingdom . |
| 92/04208 | 3/1992 | WIPO . |

Primary Examiner—Robert Oberleitner
Assistant Examiner—Tyrone M. Lee
Attorney, Agent, or Firm—Chistensen O'Connor Johnson & Kindness PLLC

[57] ABSTRACT

A retractable step assembly (10) includes a step (12) pinned to the lower ends of a pair of swing arms (14, 16) depending downwardly from a bracket (30) for mounting the step assembly to the underside of a vehicle. An electric motor (20) powers the upper end of a swing arm (14) to rotate the two swing arms between retracted and extended positions. A clutch assembly (24) is interposed between the electric motor and the swing arm (14) to allow the motor to continue to operate to the end of its cycle if the step or swing arm become obstructed. A lock assembly (170) is provided to lock the step in retracted position, with the lock being automatically disengaged when the step assembly is actuated to extend the step from retracted position.

25 Claims, 5 Drawing Sheets

RETRACTABLE, SWING DOWN STEP ASSEMBLY

FIELD OF THE INVENTION

The present invention relates to retractable steps, and more particularly to a powered, retractable, swing down step assembly for vehicles, wherein if the step is obstructed from extending or retracting, a limited level of force is supplied to the step assembly, thereby preventing damage to the step assembly or injury to the source of the obstruction.

BACKGROUND OF THE INVENTION

More sport utility vehicles are being sold than ever before. The popularity of these vehicles stem at least in part from their rugged construction, ability to safely navigate unimproved roads, as well as highways during inclement weather and their usefulness in carrying passengers and cargo. Sport utility vehicles typically have relatively high ground clearance causing access and egress from the vehicle to be difficult, especially for children, women wearing restrictive clothing and persons with diminished agility. As such, there is a need for an apparatus to assist drivers and passengers in entering and departing from sport utility vehicles, as well as other types of vehicles having entrances located relatively high above the ground.

One suggested solution in aiding entry and egress from sport utility vehicles and other high ground clearance vehicles is to mount a stationary step to the underside of the vehicle at an intermediate elevation between the ground and the entry level of the vehicle. However, such steps reduce the ground clearance of the vehicle, and thus diminish usefulness of the vehicle. Moreover, depending on the location of the fixed step laterally from the vehicle body, such fixed step could be a hazard when negotiating confined locations, for instance when passing through relatively close-fitting openings, including garage doors.

In an attempt to overcome some of the drawbacks of fixed location auxiliary steps, various retractable step systems have been developed. Some such systems are typically operated by the opening and closing of the vehicle door. When the door is opened, the step is automatically extended, and then when the door is closed, the step automatically retracts. See, for instance, U.S. Pat. Nos. 3,762,742 and 5,375,864. Other retractable systems are powered by an electrical or hydraulic motor. See, for instance, U.S. Pat. No. 5,085,450. A serious drawback of known retractable step systems is that adequate accommodations are not made if the step system becomes bound up or somehow restrained from full retraction or extension, for instance if the foot or leg of the vehicle driver or a passenger accidentally obstructs the full retraction or extension of the step system. If this occurs, it is important that human injury is avoided. It is also important that damage is not caused to the step system itself or to the vehicle. The present invention addresses these drawbacks of known powered, retractable vehicle step systems.

SUMMARY OF THE INVENTION

The present invention provides a swing down step assembly mountable on a vehicle composed of a step coupled to a swing arm assembly. A drive system is coupled to the swing arm assembly to shift the step between retracted and extended positions. To this end, torque is applied to the drive system to rotate the swing arm assembly between the retracted and extended positions. A drive motor applies torque to the drive system to rotate the swing arm assembly between extended and retracted positions. A torque slippage system is provided to allow relative rotation between the swing arm assembly and the drive motor if the swing arm assembly is obstructed during extension or retractions thereof.

In a preferred embodiment of the present invention, the torque slippage assembly includes a clutch assembly disposed between the drive motor and the swing arm assembly.

According to a further aspect of the present invention, a lock assembly is provided to lock the swing arm assembly in retracted position so that if a load is placed on the retracted step, the step remains stationary.

In accordance with a further aspect of the present invention, the lock assembly is automatically released when the drive system is actuated to rotate the swing arm assembly from retracted position to extended position.

With respect to an additional aspect of the present invention, the clutch assembly includes a clutch backer plate in torque transmitting relationship with the drive motor, a pressure plate in torque transmitting relationship with the swing arm assembly, a clutch disc disposed between the backer plate and a clutch plate, and a load applying system for pressing the clutch backer plate, clutch disc and clutch pressure plate together in face-to-face relationship to each other while enabling relative rotation between the clutch backer plate and clutch pressure plate if extension or retraction of the step is obstructed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
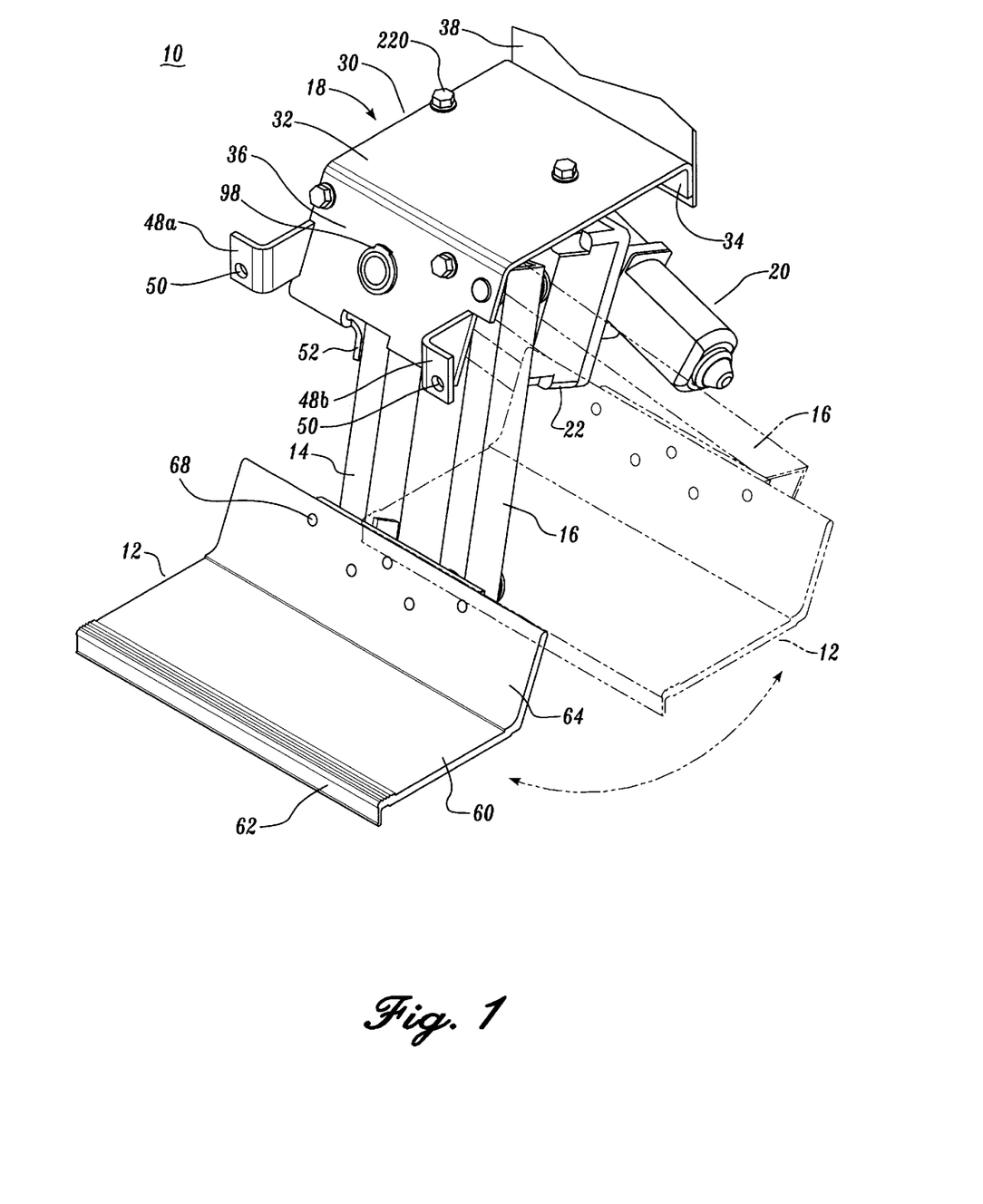
FIG. 1 is a front isometric view of the present invention with the step assembly shown in extended position in the solid line and in retracted position in phantom line.
Figure 2:
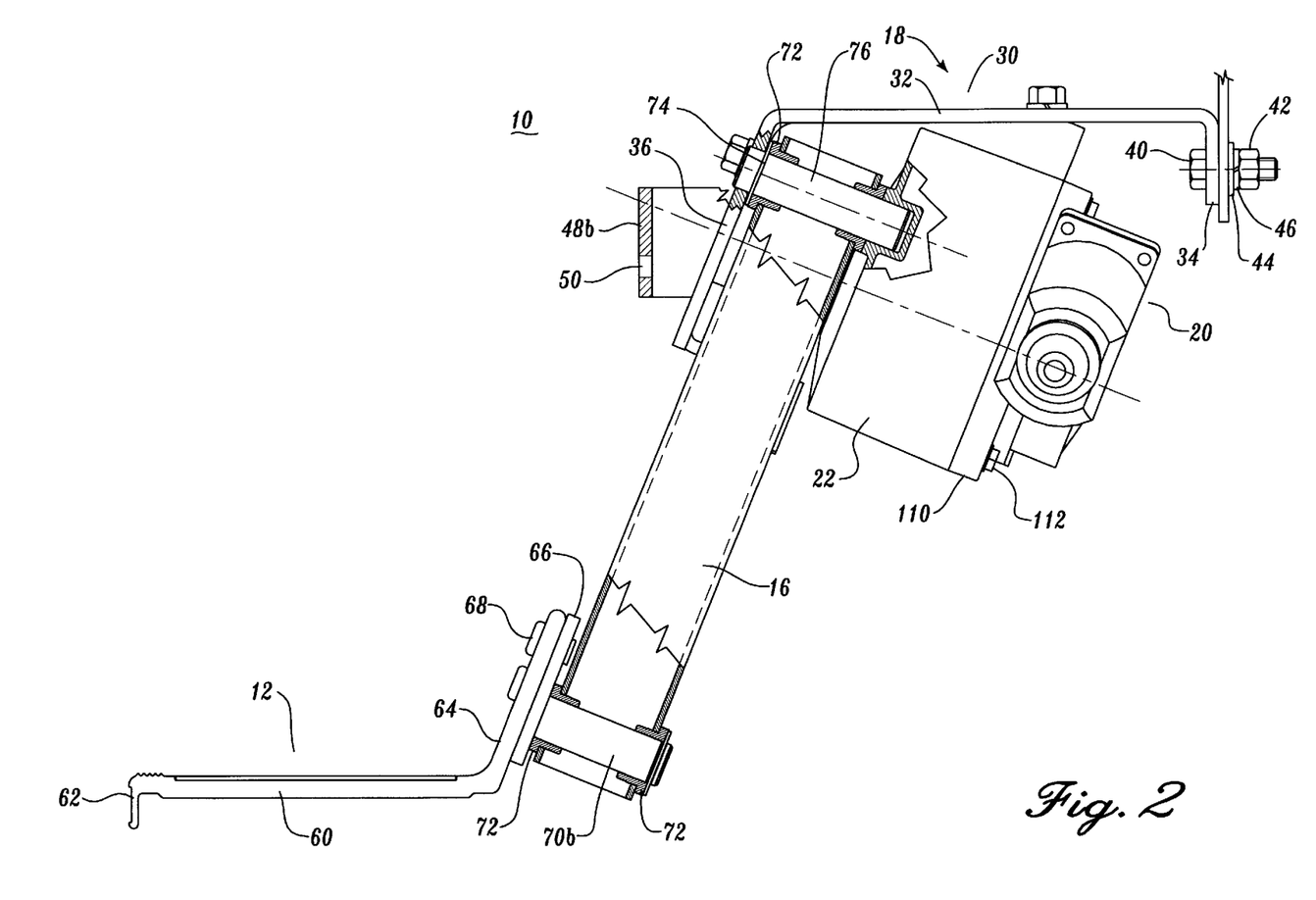
FIG. 2 is a side elevational view of the step assembly shown in FIG. 1 with portions broken away to show internal construction features.

Referring initially to FIGS. 1 and 2, in basic form the present invention includes a retractable, swing down step assembly 10 composed of a formed step 12 carried by the lower ends of parallel swing arms 14 and 16, with the upper ends of the swing arms pivotally connected to a formed mounting bracket 18 assembly. The swing arm 14 is powered by an electric motor assembly 20 mounted on the back side of a clutch housing 22 to shift the step from retracted position (shown in dotted line in FIG. 1) and extended position (shown in solid line in FIG. 1) and vice versa. The housing 22 cooperates with mounting bracket assembly 18 to pivotally support the upper ends of the swing arms 14 and 16. A clutch assembly 24 is interposed between a drive motor 20 and a swing arm 14 to allow relative rotational movement between the drive motor and swing arm if the step 12 becomes bound or restrained from free extension or retractive movement.

To describe the foregoing aspects of the present invention in more detail, the mounting bracket assembly 18 includes a formed bracket member 30 having a planar top section 32, a downwardly turned rear flange 34 and a diagonally downwardly turned forward flange 36. [In the present application, the "front" direction refers to the direction outwardly from the vehicle on which the step assembly 10 is mounted (left hand direction in FIG. 2). Correspondingly, the "rear" direction refers to the direction into the vehicle on which the step assembly is mounted (the right hand direction in FIG. 2).] The bracket assembly 18 includes a second member 38 extending upwardly from rear flange 34 for attachment to the underside of the vehicle body or chassis, not shown. The bracket members 30 and 38 may be connected together by hardware members, including bolts 40 that extend through close-fitting openings formed in the rear flange 34 and bracket 38 to engage nuts 42. Appropriate flat and lock washers 44 and 46 may be employed between the nuts 42 and the back surface of bracket 38.

A pair of angle-shaped mounting tabs 48a and 48b extend forwardly and then laterally from the side edges of bracket front flange 36 for attachment to the vehicle. In this regard, through holes 50 extend through the tabs 48 for reception of mounting hardware, not shown. A stop tab 52 extends downwardly from the lower edge of bracket front flange 36 to abut against the adjacent side of swing arm 14 when the step 12 is in extended position. The tab 52 serves as a stop for the swing arm to prevent further rotation of the swing arm in the clockwise direction as shown in FIG. 1. When the swing arms 14 and 16 are in fully extended position, as shown in FIG. 1, they are not quite at vertical "6 o'clock" position, rather than they are at about the "5:30" position. As such, if any appreciable weight is placed on step 12, such weight tends to try to cause the swing arms to rotate further in the clockwise direction towards a "bottomed out" 6 o'clock position, which further swinging is prevented by the stop tab 52.

The formed step 12 includes a planar, more rectangularity shaped foot tread portion 60 which is disposed in substantially horizontal orientation when the foot step assembly is in fully extended position. A front flange 62 extends downwardly from the forward edge of the foot tread portion 60 to avoid presenting a sharp edge to the user and also to add to the stiffness and structural integrity of the step 12. A rear flange 64 extends upwardly and diagonally rearwardly from the foot tread portion 60 to serve to attach the step to the lower ends of swing arms 14 and 16. To this end, a backing plate 66 is securely attached to the back side of rear flange 64 by a plurality of rivets 68 which extend through clearance holes formed in the rear flange 64 and also through aligned clearance holes formed in the backing plate. It would be appreciated that the rear flange 64 may be attached to the backing plate 66 by any other suitable alternative method, for instance by welding. Stub shafts 70a and 70b extend rearwardly from the back side of the backing plate 66 to extend through lower through holes formed at the bottom end portions of the swing arms 14 and 16. A pair of flanged bushings 72 engage over the stub shaft 70a and 70b and engage snugly within the through holes at the bottoms of the swing arms 14 and 16, FIGS. 2 and 3. The flange portions of the bushings 72 bear against the front and rear walls of the swing arms. C-rings 74 engage within grooves 75 formed in the free end portions of the stub shafts 70a and 70b to securely retain the stub shafts engaged with the lower ends of the swing arms while allowing relative rotation therebetween.

Figure 3:
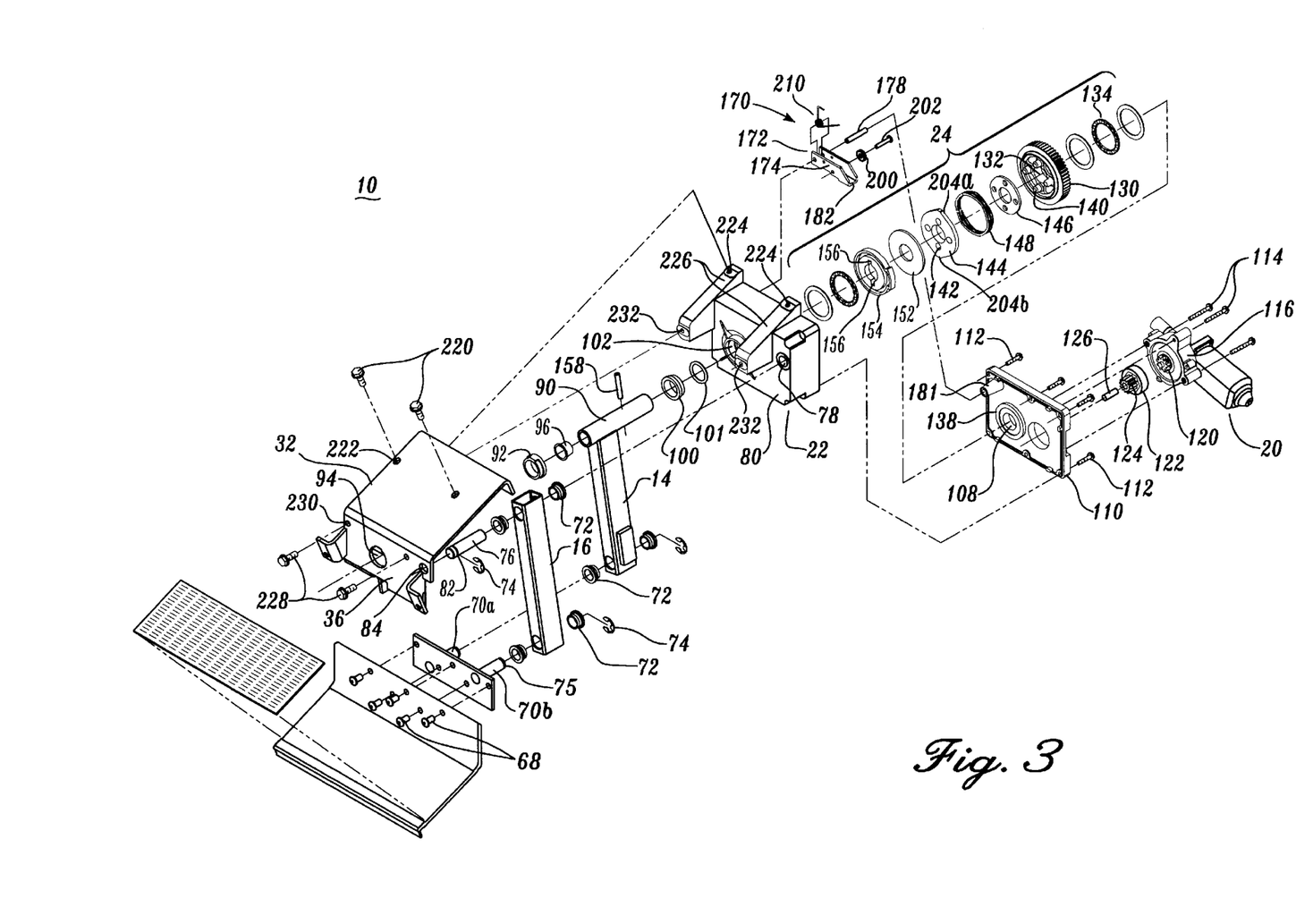
FIG. 3 is an isometric, exploded view of the components of the present invention.
Figure 4:
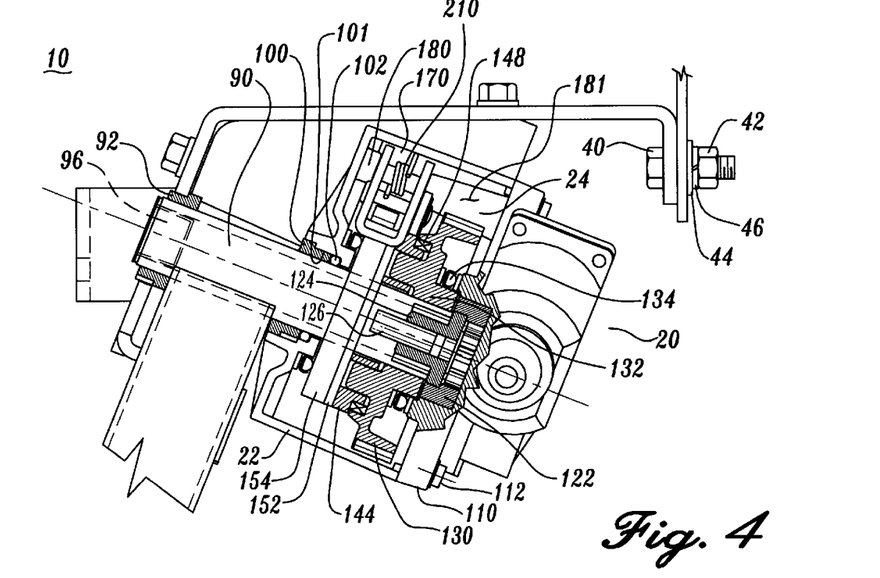
FIG. 4 is a fragmentary cross-section of the clutch assembly, specifically illustrating the drive train from the drive motor to the drive gear.

Referring specifically to FIGS. 2 and 3, a pair of bushings 72 also engage with close-fitting through holes formed in the front and rear walls of the swing arm to receive a close-fitting pin 76 which engages within a blind bore 78 formed in the front wall 80 of housing 22. The forward free end of the pin 76 engages through and is supported by a close-fitting through hole 84 formed in the front flange 36 of bracket 30. A C-ring 74 engages with a groove 82 formed in the forward free end of the pin 76 thereby to retain the pin within the blind bore 78 and engaged within hole 84.

The upper end of swing arm 14 is supported within housing 22 by a hollow torque shaft 90 extending transversely to the upper end of the swing arm. The forward end of the torque shaft 90 engages within a flanged bushing 92 which in turn snugly engages through an opening 94 formed in the front flange 36 of step assembly bracket 30. A close-fitting cap 96 engages within the hollow forward end of the torque shaft 90 to close the shaft. As shown in FIG. 1, a retaining ring 98 engages within a forward groove formed in the bushing 92 to retain the bushing engaged with the hole 94.

Figure 5:
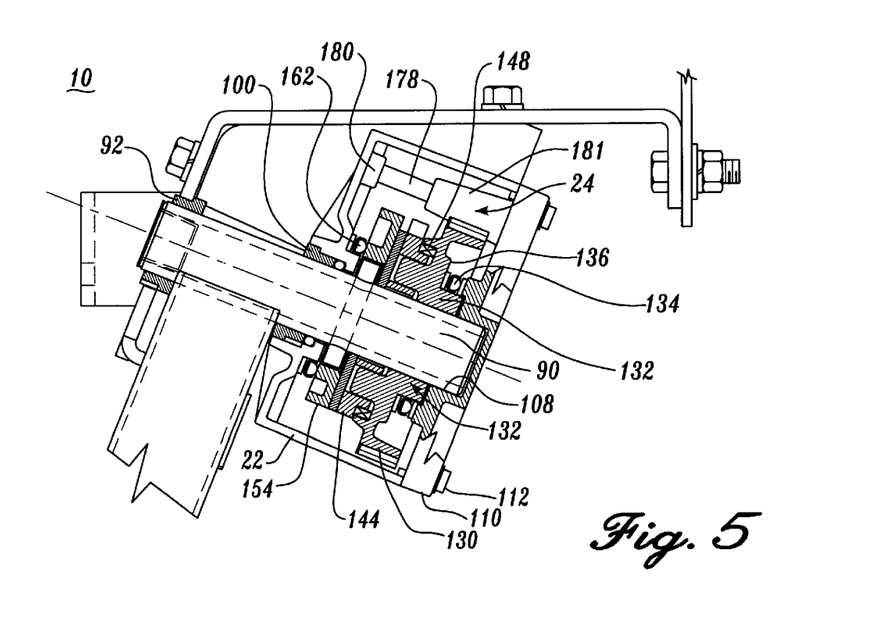
FIG. 5 is a view similar to FIG. 4 but specifically illustrating the components of the clutch assembly.

The torque shaft 90 extends transversely rearwardly from the upper end of the swing arm 14 to engage a flanged bushing 100 which snugly engages within a stepped bore 102 formed in the front wall 80 of the housing 22. An "O" ring seal 101 is compressed at the bottom of bore 102 to form a seal between shaft 90 and the housing. As shown in FIG. 5, the torque shaft 90 extends all the way through the housing 22 to engage within a blind bore 108 formed in the rear cover 110. The rear cover is detachably attached to the housing 22 by a plurality of threaded fasteners 112 that extend through clearance holes formed in the cover to engage within threaded blind holes formed in the outer perimeter of the housing. The components of the clutch assembly 24 engage over the portion of the torque shaft 90 disposed within the housing 22, as discussed more fully below.

The electric motor assembly 20 is mounted on the rear, outside surface of the housing cover 110 by a series of threaded fasteners 114 that engage through holes formed in motor mounting flange 116 to engage aligned threaded blind holes formed in the cover. The motor 20 includes an output drive gear 120 that engages within the back side of an adapter collar 122. The rear portion of the adapter collar has a female socket shaped to correspond to the drive gear 120 engaged therein. The front side of the adapter collar 122 is in the form of a hex-shaped counterbore to receive the correspondingly hex-shaped flange portion of a pinion gear 124. A pilot pin 126 engages rearwardly within a close-fitting center bore formed in the pinion gear 124 and also within a blind hole formed in the back side of the housing forward wall 80, not shown.

The pinion gear 124 meshes with a larger drive gear 130 having a center hub 132 formed with a through hole therefor for closely engaging over torque shaft 90. A rear thrust bearing 134 engages over the rearward extending portion of the center hub 132 to bear against a rear face portion 136 of the drive gear 130 and also bear against an annular face ring 138 formed in the front side of housing cover 110 that encircles blind bore 108.

Four equally spaced apart drive lugs 140 project forwardly from the center hub 132 of the drive gear 130 to engage within corresponding circular openings 142 formed in a generally circular clutch backer plate 144. A compressible, flat annular seal 146 is interposed between the back side of the clutch backer plate 144 and the front side of drive gear 130. The seal 146 includes a center opening to closely engage over the torque shaft 90 and four spaced-apart through holes for snugly engaging over the drive lugs 140. A compression spring 148 is disposed between the front side of the drive gear 130 and the back side of the backer plate 142 to apply a forward thrust to the backer plate. Preferably, the spring 148 is in the form of a multiple coil wave spring.

A circular clutch disc 152 is interposed between the front face of backer plate 144 and the rear face of a pressure plate 154. The clutch disc 152 has a central opening to engage over the torque shaft 90. The pressure plate 154 likewise has a central opening formed in the hub portion thereof for reception of the torque shaft 90 therethrough. Diametrically opposed cross-slots 156 are formed in the hub portion of the pressure plate 154 to communicate with the through hole formed in the hub portion. The cross-slots 156 are sized to receive a drive pin 158 which extends through diametrically opposed cross holes formed in the torque shaft 90. As such, rotation of the pressure plate results in corresponding rotation of the torque shaft 90. A forward thrust bearing 162 is positioned between the forward hub face of the pressure plate and the back walls of the housing 22 to facilitate free rotation of the pressure plate relative to the housing.

The present invention utilizes a lock assembly 170, which is most clearly illustrated in FIGS. 3, 4 and 6A–6C, to lock the step assembly 10 in fully retracted position. Although it is not intended that a load be placed on the step 12 when the step assembly is fully retracted, a likelihood exists that a load nonetheless will be applied thereon, especially if any appreciable clearance exists between the retracted step and the underside of the vehicle on which the step assembly is mounted. The lock assembly 170 is intended to retain the step assembly in fully retracted position even if a load, for example the foot of an individual, is placed on the retracted step 12.

In a preferred embodiment, the lock assembly 170 includes a pivot latch 172 composed of a pair of parallel arms 174. A cross pin 178 extends through aligned openings formed in the ends of the arm 174 to engage within a blind bore formed in a boss 180 projecting rearwardly from the back side of housing forward wall 80, FIG. 5. The rear end of the pin 178 is supported by a blind bore formed in a boss 181 projecting forwardly from the front face of housing cover 110 to a substantial distance within the housing as shown in FIG. 5.

Figure 6A:
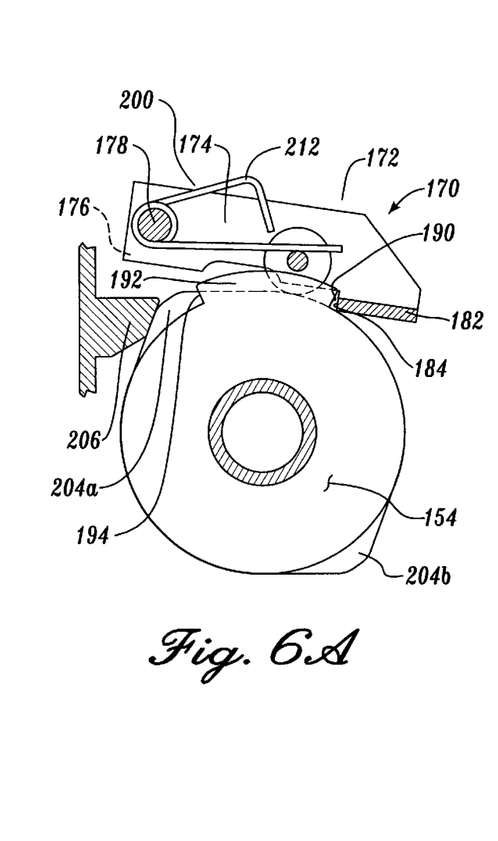
FIG. 6A is a fragmentary view of the clutch assembly taken from the left-hand side of FIG. 5 illustrating the positions of the clutch backer plate and pressure plate when the step assembly is in retracted position, as well as illustrating the lock assembly.
Figure 6B:
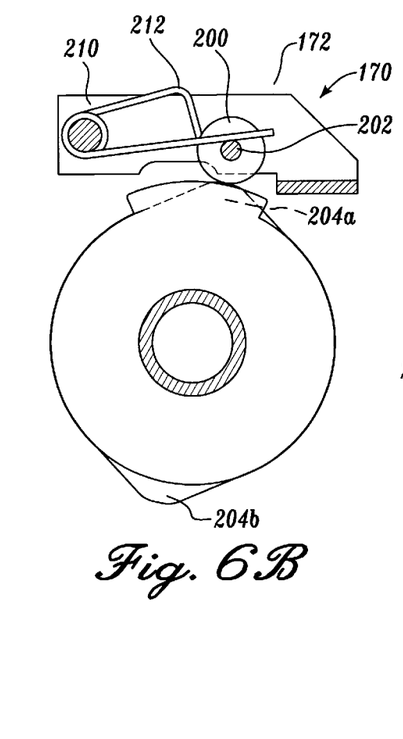
FIG. 6B is a view similar to FIG. 6A but with the step assembly being extended.

At the ends of the latch arms 174 opposite pin 178, the lower edges of the latch arms are joined by a web portion 182 having a striker portion 184 adapted to engage with corresponding end edge portion 190 of a catch lug 192 formed in the perimeter of clutch pressure plate 154. As shown in FIGS. 3 and 6A–6B, the catch lug 192 extends radially outwardly from the outer circumference of a pressure plate 154. The catch lug 192 has an opposite end edge 194, the function of which will be described more fully below.

A cam roller 200 is rotatably engaged over a pin 202 and positioned rearwardly of the rear pivot latch arm 174. The pin 202 extends through aligned cross holes formed in the two pivot latch arms. The cam roller 200 is positioned to roll along the outer circumference of the clutch backer plate 144. The outer circumference of the backer plate is substantially circular, but with diametrically opposed lobes 204a and 204b formed in the outer circumference thereof. The lobes are sized and shaped to abut lug 206 against an abutment lug formed in the interior of the housing 22 to limit rotation of the clutch backer plate in both the clockwise and counterclockwise directions.

A torsion spring 210 is provided to maintain downward pressure on the pivot latch 172 to maintain the cam roller 200 in contact against the outer circumference of the backer plate 144, including the lobes 204a and 204b thereof. The torsion spring includes center windings that are sized to engage over pin 178. The torsion spring also includes an upper arm that has a downwardly bent end portion forming an abutment corner 212 to bear against the underside of the top wall of the housing 22. The torsion spring further includes a lower arm that bears against the top side of pin 202 used to mount the cam roller 200 to the pivot latch 172.

The housing 22 is bolted to the underside of bracket 30 by threaded fasteners 220 that extend downwardly through clearance holes 222 formed in bracket top 32 to engage within threaded holes 224 formed in diagonal mounting wings 226 extending upwardly from the upper side of the housing 22 and forwardly of the front wall 80 of the housing. Additional threaded fasteners 228 extend through close-fitting through holes formed in the front flange 36 of bracket 30 to engage within threaded holes 232 formed in the front ends of the mounting wings 226. It will be appreciated that by attaching the bracket 30 to the housing 22 in the foregoing manner stiffens the mounting bracket assembly 18 and enhances the overall rigidity and structural integrity of the step assembly 10 of the present invention.

In the operation of a step assembly 10, the position of the step 12 is typically dependent on whether the door under which the step assembly is mounted is either open or closed. When the door is opened, the step assembly is extended to swing the arms 14 and 16 downward so that the step 12 is in lowered position as shown in solid lines in FIG. 1. Correspondingly, when a door is closed, the swing arms 14 and 16 are pivoted upwardly to place the step 12 closely beneath the door opening of the vehicle. This extension and retraction of the step assembly is typically controlled by a switch actuated by the opening and closing of the vehicle door thereby to power the electric motor 20 to rotate the drive gear 120 thereof in a first direction to extend the step 12 downwardly and correspondingly rotate the drive gear in the opposite direction to retract the step 12 upwardly.

When the step assembly is in retracted position, the clutch backer plate 144 and pressure plate 154 are in the positions shown in FIG. 6A with the cam lobe 204a of the backer plate abutted against housing lug 206 and with the catch first end edge 190 engaged against the striker portion 184 of pivot latch 172. This prevents the pressure plate, and thus the swing arms 14 and 16, from rotating in the clockwise direction as shown in FIGS. 1 and 6A, even if a substantial load is placed on the retracted step 12.

To lower the step 12, the motor 20 is activated to rotate the clutch backer plate in the clockwise direction so that lobe 204a thereof rolls against cam roller 200 thereby pivoting the pivot latch 172 upwardly so that the striker portion 184 thereof is lifted away from the catch lug 192, as shown in FIG. 6B. As a consequence, the friction acting between the backer plate and the clutch pressure plate will then cause the clutch pressure plate to rotate in the clockwise direction with the backer plate until the lug 204b of the backer plate abuts against housing lug 206. It will be appreciated that during the initial rotation of the clutch backer plate from the position shown in FIG. 6A to the position shown in FIG. 6B, the clutch backer plate rotates (slips) relative to the clutch pressure plate. When the clutch backer plate rotates sufficiently clockwise so that the lug 204b thereof is bottomed against housing lug 206, the swing arm 14 has by then stopped against tab 52 so that step 12 is in fully lowered position.

Figure 6C:
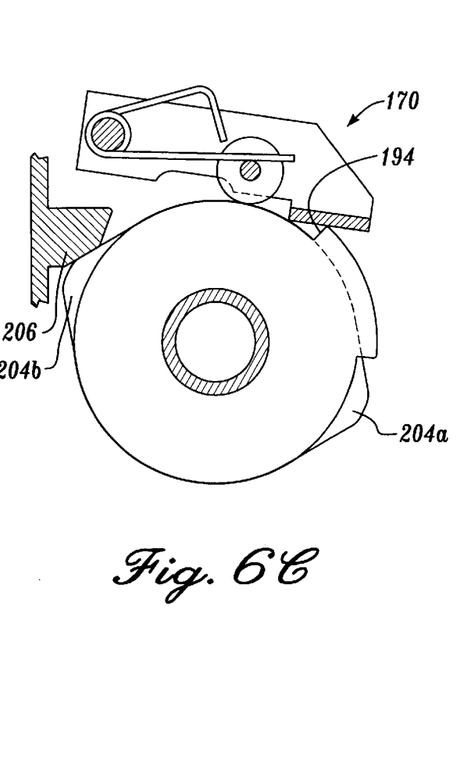
FIG. 6C is a view similar to FIGS. 6A and 6B, showing the relative positions of the backer plate and pressure plate when the step assembly is in fully extended position.

The step 12 is retracted upwardly by actuating motor 20 to reverse the rotation of the clutch backer plate, i.e., to rotate the clutch backer plate in the counterclockwise direction as then shown in FIGS. 6A–6C. As the clutch backer plate rotates in a counterclockwise direction from the position shown in FIG. 6C, the clutch pressure plate is correspondingly rotated causing the second end edge 194 of the catch lug 192 to ride along the bottom surface of pivot latch web 182, which does not restrict the rotation of the pressure plate 154.

By the time the clutch backer plate 144 has been fully rotated in the counterclockwise direction to the position shown in FIG. 6A, so that lobe 204a strikes against lug 206, the pressure plate has rotated sufficiently counterclockwise so that the striker portion 184 of web 182 bears against end edge 190 of catch lug 192. In accordance with the present invention, if an obstruction prevents the swing arms 14 and 16 from rotating into a fully retracted position, for instance, by a foot or other body part lodged between the step 12 and the underside of the vehicle on which the step assembly is mounted, the clutch backer plate 144 can continue to rotate in the counterclockwise direction while the clutch pressure plate remains stopped against the obstruction. It will be appreciated that the level of torque differential acting between the clutch backer plate and the pressure plate whereupon relative rotation occurs therebetween, is in large part due to the force that spring 148 applies against the back side of the clutch backer plate. Ideally, this torque differential is approximately 5.8 ft. lbs. This equates to about 4.6 lbs. of downward pressure applied at the center of the step 12. As apparent, this pressure is of sufficient low level to avoid injury to a foot or other body member that might be lodged between the step 12 or swing arms and the underside of the vehicle on which the step assembly is mounted. If an obstruction prevents full retraction of the step assembly 10 and once the clutch backer plate 144 has rotated (relative to the pressure plate) to assume its full counterclockwise position as shown in FIG. 6A, the power to motor 20 is terminated.

Once the obstruction has been cleared, the door is opened to rotate both the clutch backer plate and the clutch pressure plate in the clockwise direction until lobe 204b bottoms against lug 206. Because of the obstruction, the backer plate and pressure plate likely will be out of phase, i.e., the pressure plate will be rotated clockwise relative to the backer plate. Thus, during rotation of the backer plate in the clockwise direction, the pressure plate will stop rotating earlier than the backer plate in that the swing arm 14 will be stopped against tab 52. Nonetheless, the backer plate will continue to rotate in the clockwise direction relative to the pressure plate until the lobe 204b bottoms against housing lug 206. Thereupon, the backer plate and pressure plate will be again correctly indexed relative to each other. The door is then closed to rotate the backer plate and pressure plate in the counterclockwise direction until lobe 204a bottoms against lug 206, by which time the swing arms 14 and 16 will be rotated in a fully upward retracted position and web striker portion 184 locked against end edge 190 of catch lug 192.

It will be appreciated that the step assembly 10 may be obstructed not only during retraction, but also during extension. In such case, a clutch backer plate 144 would continue to rotate in the clockwise direction while the clutch pressure plate 154 is restrained against rotation by the obstruction. The relative slippage between the clutch backer plate and clutch pressure plate avoids damage to the step assembly, and also to the source of the obstruction.

While the preferred embodiment of the invention has been illustrated and described, it will be apparent that various changes can be made therein without departing from the spirit and scope of the invention.

The embodiments of the invention in which an exclusive property or privilege is claimed are defined as follow:

1. A swing-down step assembly for mounting on a vehicle, comprising:
    (a) a step;
    (b) a swing arm assembly having a first end portion coupled to the step; and
    (c) a drive system coupled to a second portion of the swing arm assembly at a location spaced from the first end portion of the swing arm assembly, the drive system comprising:
        (i) a drive motor to apply torque to the drive system to rotate the swing arm assembly between a first retracted position and a second extended position; and
        (ii) a torque slippage assembly to allow relative rotational movement between the second end portion of the swing arm assembly and the drive motor at a selected torque differential between the step assembly and the drive motor.

2. A swing-down step assembly according to claim 1, wherein the torque slippage assembly includes a clutch assembly disposed between the drive motor and the second end portion of the swing arm assembly.

3. A swing-down step assembly according to claim 2 further comprising a lock assembly to lock the swing arm assembly in first retracted position.

4. A swing-down step assembly according to claim 3, wherein the lock assembly is released by the clutch assembly when the swing arm assembly is rotated from first retracted position to second extended position.

5. A swing-down step assembly according to claim 4, wherein the clutch assembly comprises:
    (a) a clutch backer plate in torque transmitting relationship with the drive motor;
    (b) a pressure plate in torque transmitting relationship with the second end portion of the swing arm assembly;
    (c) a clutch disc disposed between the clutch backer plate and the pressure plate; and
    (d) means for pressing the clutch backer plate, clutch disc and clutch pressure plate in face-to-face relationship to each other.

6. A swing-down step assembly according to claim 5, wherein the lock assembly comprising:
    a latch; and
    a catch positioned at a peripheral location on the pressure plate and engageable with the latch when the swing arm assembly is in first retracted position.

7. A swing-down step assembly according to claim 6, wherein the latch is disengaged from the catch by rotation of the clutch backer plate.

8. A swing-down step assembly according to claim 3, wherein the clutch assembly comprising:
   (a) a clutch backer plate drivingly engaged with the drive motor;
   (b) a pressure plate drivingly engaged with the second end portion of the swing arm assembly;
   (c) a clutch disc disposed between and in face-to-face relationship with the clutch backer plate and the clutch pressure plate; and
   (d) means for pressing the clutch backer plate, the clutch disc and the clutch pressure plate in face-to-face relationship with each other.

9. A swing-down step assembly according to claim 8, wherein the lock assembly comprising:
   a latch; and
   a catch positioned at a peripheral location on the clutch pressure plate and engaged with the latch when the swing arm assembly is in first, retracted position.

10. A swing-down step assembly according to claim 9, wherein the latch is disengaged from the catch by rotation of the clutch backer plate.

11. A swing-down step assembly according to claim 2, wherein the clutch assembly comprising:
   (a) a clutch backer plate drivingly engaged with the drive motor;
   (b) a pressure plate drivingly connected to the second end portion of the swing arm assembly;
   (c) a clutch disc having a first face disposed in face-to-face relationship to the clutch backer plate and a second face disposed in face-to-face relationship with the clutch pressure plate; and
   (d) means for pressing the clutch backing plate, clutch disc and clutch pressure plate in face-to-face relationship to each other.

12. A swing-down step assembly according to claim 11, further comprising a lock assembly to lock the swing arm assembly in first retracted position, the lock assembly comprising:
   a latch; and
   a catch located at a peripheral location on the clutch pressure plate, the catch engaged with the latch when the swing arm assembly is in first retracted position.

13. A swing-down step assembly according to claim 12, wherein the latch is disengageable from the catch by rotation of the clutch backer plate.

14. A swing-down step assembly according to claim 1, further comprising a lock assembly to lock the swing arm assembly in first retracted position.

15. A swing-down step assembly according to claim 14, wherein the lock assembly is disengaged by the torque slippage assembly when the swing arm assembly is rotated from first retracted position to second extended position.

16. A swing-down step assembly according to claim 1, wherein the swing arm assembly includes first and second substantially parallel swing arms, the first and second swing arms having first end portions rotatably coupled to the step, and the drive system coupled to a second end portion of at least one of the swing arms to swing the swing arms in unison with each other between a first retracted position and a second extended position.

17. A swing-down step assembly according to claim 1, further comprising a mounting bracket for mounting the retractable step assembly to a vehicle, a second end portion of the swing arm rotatably coupled to the mounting bracket.

18. A retractable step assembly, comprising:
   (a) a mounting bracket;
   (b) a step;
   (c) a linkage assembly for mounting the step to the mounting bracket;
   (d) a drive assembly coupled to the linkage assembly for driving the linkage assembly between an operative position and a storage position; and
   (e) a torque differential slippage system to allow relative movement between the drive assembly and the linkage assembly at a selected resistance torque level applied to the step.

19. A retractable step assembly according to claim 18, wherein the torque differential slippage system comprising:
   (a) a rotatably driven backer plate;
   (b) a pressure plate rotatably coupled to the linkage assembly;
   (c) a friction member disposed between the backer plate and the pressure plate; and
   (d) a load applier to load the backer plate, friction disc and pressure plate to each other.

20. The retractable step assembly according to claim 19, further comprising a lock assembly to lock the linkage assembly in storage position.

21. A retractable step assembly according to claim 20, wherein the lock assembly is engageable with the pressure plate to prevent rotation of the pressure plate in a direction of movement of the swing arm from storage position to operative position.

22. A retractable step assembly according to claim 21, wherein the lock assembly comprising:
   a latch; and
   a catch positioned at a peripheral location on the pressure plate, the catch engageable with the latch when the linkage assembly is in storage position.

23. A retractable step assembly according to claim 22, wherein the latch is disengaged from the catch by rotation of the backer plate.

24. A retractable step assembly according to claim 23, wherein the linkage assembly comprises at least one swing arm, the swing arm having a first end portion connected to the step and second end portion pivotally connected to the mounting bracket.

25. A retractable step assembly according to claim 24, wherein the second end portion of the at least one swing arm drivingly connected to the drive assembly.

* * * * *

UNITED STATES PATENT AND TRADEMARK OFFICE
CERTIFICATE OF CORRECTION

PATENT NO. : 5,842,709
DATED : December 1, 1998
INVENTOR(S) : M.M. Maccabee

It is certified that error appears in the above-indentified patent and that said Letters Patent is hereby corrected as shown below:

Title page,

| COLUMN | LINE | | |
|---|---|---|---|
| col. 2 | Attorney, Agent or Firm | "Chistensen" should read --Christensen-- | |
| 8 (Claim 3, | line 3) 45 | before "first retracted position" insert --a-- | |
| 8 (Claim 4, | line 3) 48 | before "first retracted position" insert --a-- | |
| 8 (Claim 4, | line 4) 49 | before "second extended position" insert --a-- | |
| 8 (Claim 6, | line 6) 67 | before "first retracted position" insert --a-- | |
| 9 (Claim 9, | line 6) 22 | before "first, retracted position." insert --a-- | |
| 9 (Claim 12, | line 3) 42 | before "first retracted position," insert --a-- | |
| 9 (Claim 12, | line 8) 47 | before "first retracted position." insert --a-- | |

UNITED STATES PATENT AND TRADEMARK OFFICE
CERTIFICATE OF CORRECTION

PATENT NO. : 5,842,709
DATED : December 1, 1998
INVENTOR(S) : M.M. Maccabee

It is certified that error appears in the above-indentified patent and that said Letters Patent is hereby corrected as shown below:

| COLUMN | LINE | |
|---|---|---|
| 9 (Claim 14, line 3) | 53 | before "first retracted position." insert --a-- |
| 9 (Claim 15, line 4) | 57 | before "first retracted position." insert --a-- |
| 9 (Claim 15, line 4) | 57 | before "second extended position." insert --a-- |
| 10 (Claim 20, line 3) | 35 | before "storage position." insert --a-- |
| 10 (Claim 21, line 4) | 39 | before "storage position" insert --a-- |
| 10 (Claim 21, line 5) | 40 | before "operative position" insert --an-- |
| 10 (Claim 22, line 6) | 46 | before "storage position." insert --a-- |
| 10 (Claim 24, line 4) | 53 | before "second end portion." insert --a-- |

UNITED STATES PATENT AND TRADEMARK OFFICE
CERTIFICATE OF CORRECTION

PATENT NO. : 5,842,709
DATED : December 1, 1998
INVENTOR(S) : M.M. Maccabee

It is certified that error appears in the above-indentified patent and that said Letters Patent is hereby corrected as shown below:

COLUMN     LINE

10             56            after "swing arm" insert --is--

(Claim 25, line 2)

Signed and Sealed this

Third Day of August, 1999

Attest:

Q. TODD DICKINSON

*Attesting Officer*     Acting Commissioner of Patents and Trademarks